Figure 1:
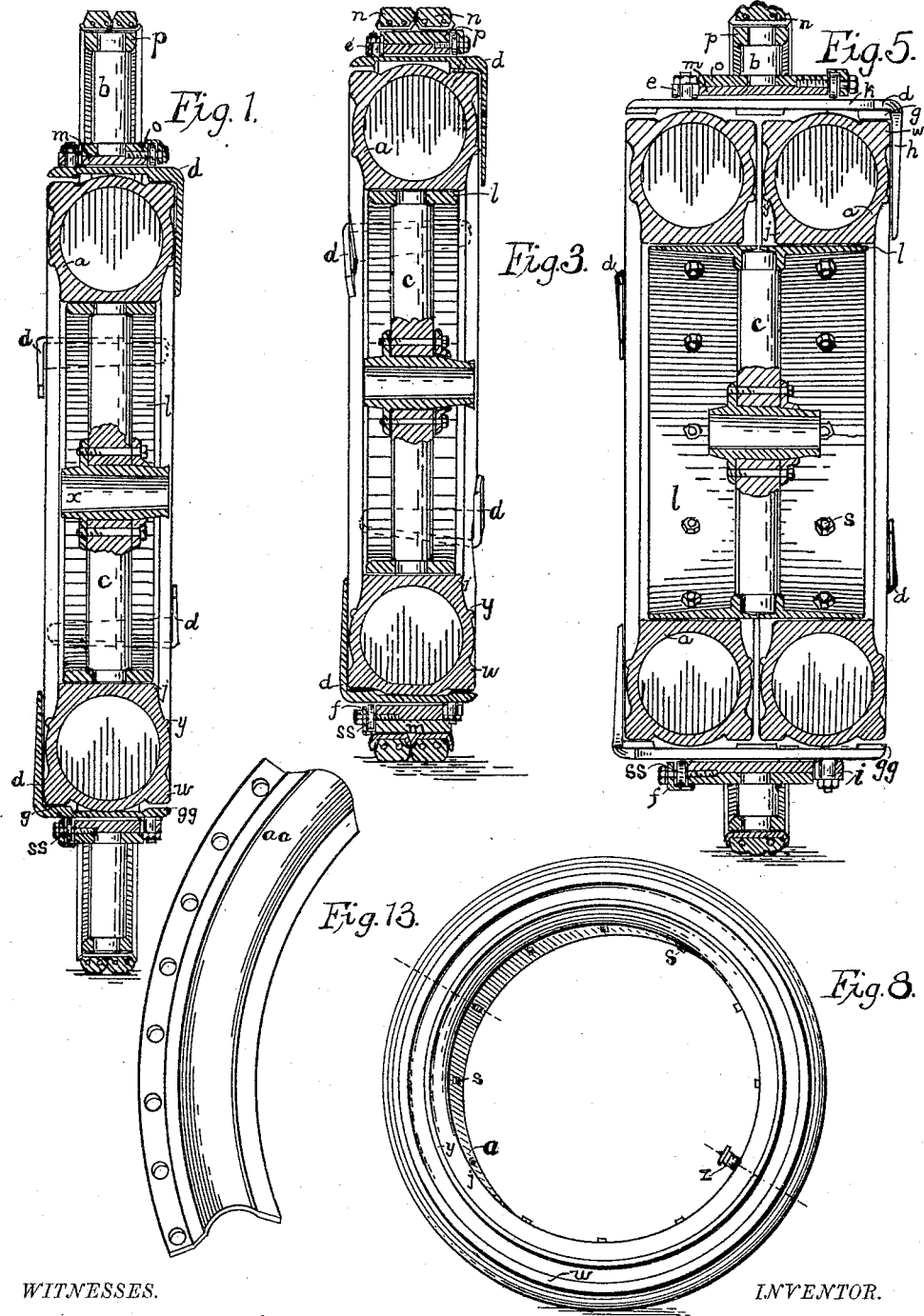

M. M. BAILEY.
VEHICLE WHEEL.
APPLICATION FILED OCT. 7, 1907.
1,067,960.
Patented July 22, 1913.
3 SHEETS—SHEET 2.
Fig. 2.
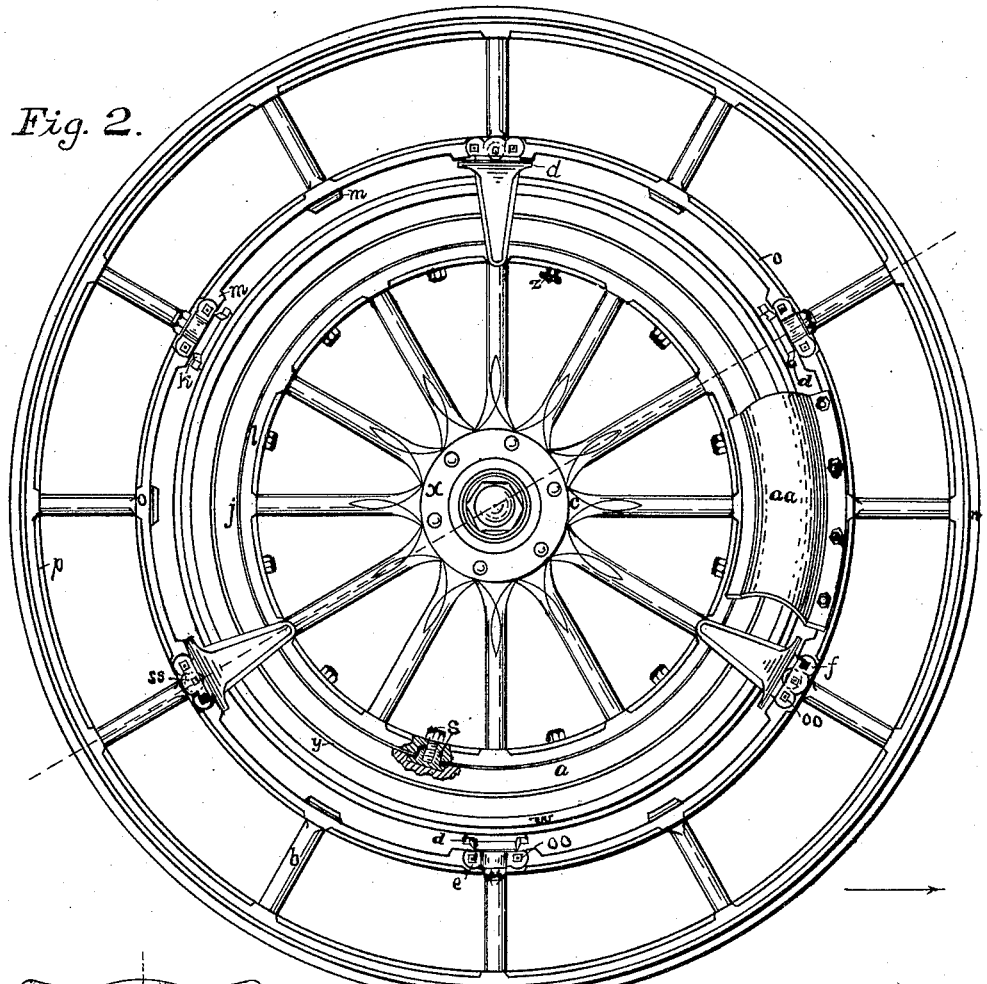
Figs. 11.
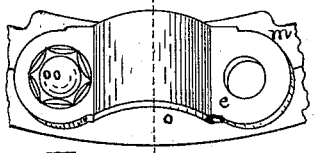
Fig. 12.
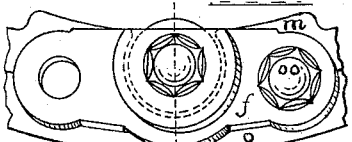
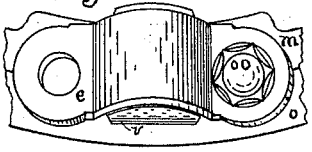
Fig. 10.
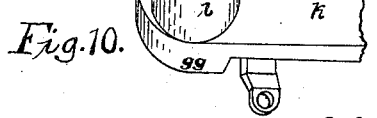
Fig. 9.
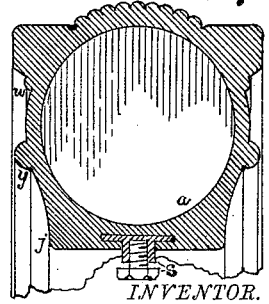
WITNESSES.
Alfred Soper.
Ernest Newman
INVENTOR.
Marion Milton Bailey
COLUMBIA PLANOGRAPH CO., WASHINGTON, D. C.

M. M. BAILEY.
VEHICLE WHEEL.
APPLICATION FILED OCT. 7, 1907.
1,067,960.
Patented July 22, 1913.
3 SHEETS—SHEET 3.
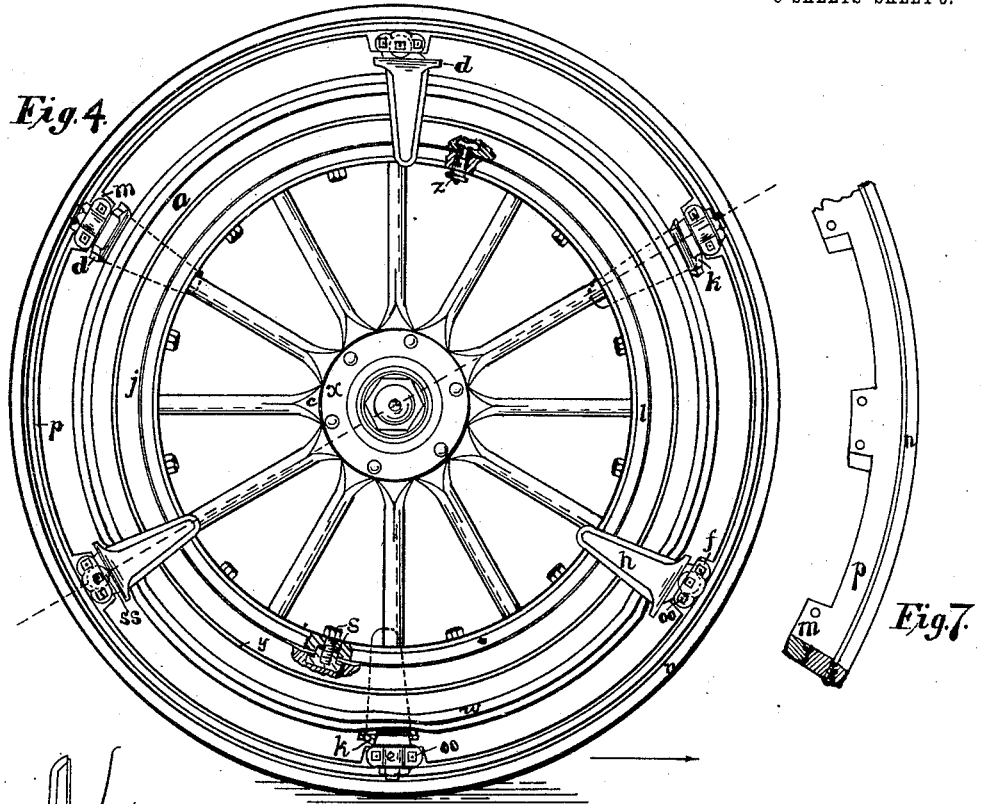
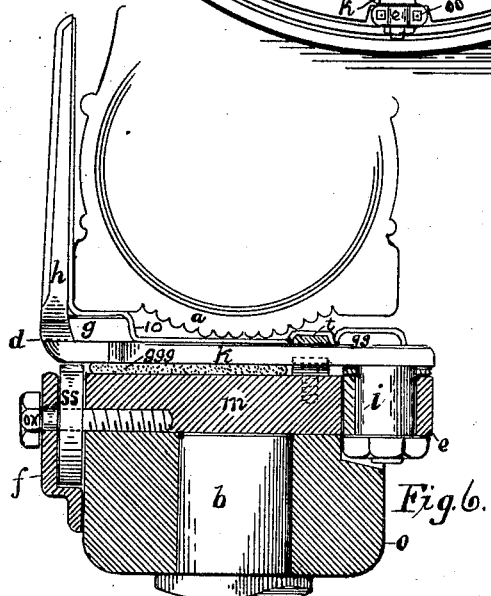
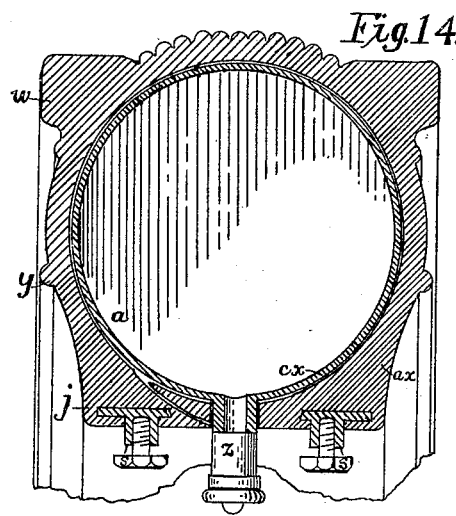
WITNESSES.
Alfred Soper.
Ernest Newman
INVENTOR.
Marion Milton Bailey

UNITED STATES PATENT OFFICE.

MARION MILTON BAILEY, OF SPRINGFIELD, OHIO.

VEHICLE-WHEEL.

1,067,960.  Specification of Letters Patent.  Patented July 22, 1913.

Application filed October 7, 1907. Serial No. 396,232.

*To all whom it may concern:*

Be it known that I, MARION MILTON BAILEY, a citizen of the United States of America, residing at Springfield, county of Clark, and State of Ohio, have invented certain new and useful Improvements in Vehicle-Wheels; and I do hereby declare the following to be a full, clear, and exact description of same, such as will enable persons skilled in the art to which they appertain to make and use same.

My invention relates to vehicle wheels, strong, durable, economical, easy of control, and highly resilient, in which the resilient bodies are so related to other members of the wheel as to be practically free from friction and abrasion in use, are located sufficiently remote from roadway tread of wheel to relieve the resilient bodies from the destructive effects of continuous interference with external objects; are so related to other members of the wheels as to freely receive, absorb and resist hub and ground wheel thrusts from practically all directions and angles; and in which, in action, the resilient bodies are securely and automatically gripped by members of the ground wheel ahead of ground wheel and resilient body centers, in line of motion, are simultaneously released rearward of the ground wheel and resilient body centers, automatically superimposing a portion of load on ground wheel ahead of its roadway contact and center of stable equilibrium; and, in which, resilient bodies are similarly gripped in their lower quarters, while rigidly secured to hub portion, causing hub and ground wheel to rotate together in action.

With these, and other objects in view, which may hereinafter appear and be more particularly pointed out and specifically claimed, my invention consists in the means shown, or their equivalent, for carrying into practical execution the objects as above outlined.

While my invention may be adapted to different forms and conditions by modifications in the structure and minor details without departing from the essential features thereof of which the following is a specification, the preferred embodiment is shown in the accompanying drawings in which corresponding and like parts are indicated and referred to by the same reference characters.

Figure 1 is a sectional view showing normal disposition of resilient body, and other parts of wheel, relative to one another. Fig. 2 is a side elevation showing normal relationship of hub portion, resilient body, ground wheel, and connecting members. Fig. 3 is a cross section view showing constrictive gripping of connecting members on the resilient body. Fig. 4 is a side elevation showing relationship of resilient body, connecting members, and ground wheel, to each other in action. Fig. 5 shows a modification of the resilient body. Fig. 6 shows one of the connecting members, and its supports, engaging resilient body, and the ground wheel. Fig. 7 shows a section of a modified form of ground wheel. (See Fig. 4.) Fig. 8 is a side view of a pneumatic type of resilient body, its binding lugs, and valve stem. Fig. 9 is a cross section view of Fig. 8. Fig. 10 is a view of axle and keeper securing connecting members in place. Fig. 11 is a view of a recessed bracket for securing connecting members to ground wheel, or for supporting bearings under free ends of connecting members. Fig. 12 shows a recessed bracket carrying a roller bearing for supporting free end of a connecting member, on the ground wheel. Fig. 13 shows a section of a sand and mud guard for incasing resilient body and connecting members (see Fig. 2). Fig. 14 is a cross section view of a double tube pneumatic type resilient body.

My invention consists of a hub properly spoked and rimmed, an annular resilient body securely seated on hub portion rim, and having annular buffer shoulders on each side thereof, a ground wheel superimposed over the resilient body, and a series of pivotal members transversely interposed between the ground wheel and the resilient body, pivotally secured to ground wheel, and adapted to engage buffer shoulders, ribs, and bases on the resilient body.

In more particularly describing my invention, it will be observed in Figs. 1, 2, and 4, that the hub portion of my wheel consists of any approved type of vehicle hub "$x$" fitted with any kind of suitable spokes "$c$" and rimmed in usual manner, with rims, "$l$," having suitable holes bored therein for securing binding lugs of resilient body and, the assemblage being fitted to vehicle axles with any approved boxing or bearings.

The resilient body, preferably an annular pneumatic cushion, may be of any suitable material. The preferred pneumatic cushion "a" Figs. 1 and 2, is an annular pneumatic tube, (or an outer tube ax and inner tube cx, Fig. 14 having a broad flat base on outer tube) with thickened buffer bodies on each side thereof, the annular base being suited to fit over the flat periphery of rim "l" and having lugs "s," Fig. 8, embedded therein at equal intervals to extend into holes bored in rim "l" to which rim they and resilient body are rigidly secured by binding screws entering holes in rim "l" from inside thereof, and engaging each of the said lugs. A suitable valve-stem and valve "z," Fig. 4, for inflating the said pneumatic cushion is also seated in the flat base of the resilient body and protrudes through the rim "l" for attachment of pump. Near the outer periphery of the resilient body are annular buffers or shoulders, "w", Figs. 2, 4, and 9, on each side of the resilient body, both laterally and peripherally faced and disposed for peripherally and laterally engaging the transversely disposed pivotal members "d", Figs. 1, 2 and 6 of the ground wheel. Preferably midway between the buffer shoulders "w" and the inner circle of base "j", Fig. 9, of resilient body is an annular buffer rib "y", Figs. 1, 2, and 9, on each side of the resilient body, for engaging the pivotal members of the ground wheel. The buffer shoulders, "w," and ribs, "y", also prevent friction of pivotal members "d", on the air-retaining walls or portion of the resilient body. On each side of the resilient body, and in the base thereof are thickened buffer bases "j", Fig. 9, also for engaging pivotal members on the ground wheel, and for supporting resilient body against lateral thrusts applied thereon. As will be seen in Figs. 6 and 9, buffer shoulders "w," ribs "y", and bases "j", are disposed on the resilient body at normally, progressively, greater distances from engaging portions of pivotal members of the ground wheel, in the order of their naming. While the preferable form of resilient body is in one piece, I claim the full right of using an inner tube and an outer casing, and, of joining, or mounting a plurality of annular resilient bodies, side by side, to secure an annular resilient body.

The ground wheel of my invention may, preferably, Fig. 2, be an inner wood rim "o", with equally spaced extensions "m" extending inward therefrom, and an outer wood rim "p" suitably secured to rim "o" with wood spokes or blocks, "b," or it may be an outer rim, "p", Figs. 4 and 7, fitted with suitable inwardly projecting extensions "m". The extensions "m" in each model bear the pivotal members "d", pivotally secured thereto and engaging the buffer shoulders of resilient body intermittently in supporting the load, as well as continuously in maintaining the hub portion and ground wheel in coöperation in same relative plane. The rim "p" is mounted with suitable tires "n", Figs. 1, 4 and 7.

In "ggg", Fig. 6, is shown a buffer pad of textile felt, or suitable flexible material, secured to extensions "m" between the bracket supports "e" and "f" under each pivotal member "d" and in loose engagement therewith for preventing lodgment of pebbles, or other foreign bodies between the pivotal members "d" and the extensions "m" of the ground wheel.

The L shaped pivotal members "d" Figs. 2 and 6, preferably of steel or iron, interposed between the hub portion and the ground wheel, each consists of a broad, flat, blade-like, transverse body "k", Fig. 6, on free end of which is a flat arm or projection "h", Figs. 2 and 6, extending radially inward at right angles from transverse body "k", laterally along and, alternately on opposite sides of the resilient body and the plane of the wheel for lateral, alternative, constrictive, conjunctional engagement with the buffer shoulders "w", buffer ribs "y" and buffer bases "j", Figs. 4 and 9, on the resilient body. On inside of angle formed by arm or extension "h", joining body "k", is a buffer seat "g" for engaging periphery of buffer shoulders, "w", on resilient body. On other, secured end of body "k" member "d", is a buffer seat "gg" lower than buffer seats "g", normally out of engagement with buffer shoulders "w", and, extending radially inward from body "k". On same end of body k is an axle "i", Fig. 6 extending radially outward at right angles to body "k" for reception in the recessed bracket "e", Figs. 2 and 6, in pivotally securing the transverse member "d" to extensions "m" on the ground wheel rim "o" or rim "p" alternately on opposite sides of ground wheel. The brackets "e" holding axles "i", and brackets "f" on opposite sides of wheel, holding roller bearings, "ss", are rigidly secured to extensions "m", by means of suitable bolts "oo".

A suitable keeper "l" embracing body "k", member "d", rigidly and removably secured to extensions "m" on rim "o" or "p", by means of suitable bolts or screws, retains the axle "i" in position in bracket "e" and retains pivotal member "d" in engagement with bearings "v", or roller bearings "ss", in recessed bracket "f", hereinafter described, Fig. 6. On opposite sides of extensions "m"

of the ground wheel, opposite recessed brackets "e", on each side of wheel and alternating with brackets "e", on same side of ground wheel, are recessed brackets "f", Figs. 6, and 12, rigidly secured to extensions "m" by means of bolts "oo", bearing their recessses, on axles or supports "ox", Fig. 6, wood, fiber, or metal, axle-mounted rollers extending radially inward from recessed brackets "f". Brackets "e" and bearings "v" Fig. 11, afford modifications of supports "f" and "ss". The bearings "ss" and "v" engage the free ends of pivotal members "d" and carry the body "k" sufficiently out of contact with extensions "m", to prevent friction between pivotal members "d" and extensions "m", as members "d" swing about their axles "i" with the resilient body. The inner faces of members "d" are protected from corrosive contact with resilient body members by sheets of leather, fiber, or such suitable material, "io", Fig. 6, attached to member "d".

In Figs. 2 and 13 is shown an annular, outwardly curved mud and sand guard or apron "aa," of thin metal, or stiffened textile material, preferably of canvas and rubber structure to be suitably and removably secured to rims "o" or "p," preferably by small bolts binding the two aprons to the rims from each side of the wheel and incasing the resilient body and pivotal members in a chamber free from mud and sand while allowing free action of the hub portion within the ground wheel.

Having fully described the construction of my invention so that anyone skilled in the art, may build and assemble its parts, I desire to more fully describe some of the action and coöperation of its members in use. Having rigidly secured the resilient body to the hub portion by means of lugs "s," having mounted pivotal members on extensions "m" by means of brackets "e" and "f," and having mounted the hub and resilient body in the ground wheel, it will be found that buffer seats "g" Fig. 6, are in normal peripheral engagement with the buffer shoulders "w" on each side of the resilient body, and that extensions "h" are in normal lateral engagement with buffer shoulders "w" on each side of the resilient body, maintaining the resilient body out of contact with ground wheel and its members and maintaining the various members of the wheel in the same relative plane. This done, it will be apparent that wheel may be readily dissembled by removing keepers and consecutive pivotal members from one side of ground wheel when resilient body and hub portion may be pressed laterally out of ground wheel, and be replaced and wheel reassembled by reversing the operation, and its order of being done. A gravitational load being now imposed on the hub, that member and the resilient body will be depressed relative to the ground wheel and buffer shoulders "w" engaging buffer seats "g" and extensions "h" forward and rearward, will carry free ends of pivotal members "d" momentarily forward and rearward of wheel center downward relative to ground wheel, causing extensions "h" to conjunctively and constrictively grip the buffer shoulders and their sustaining resilient body—suspending portions of said load on ground wheel forward and rearward of the wheel center as the result of extensions "h" swinging laterally inward toward each other about their respective axle supports "i." Such depression of hub portion of wheel also simultaneously engages buffer seats "gg" with shoulders "w" on resilient body, in lower sections of the wheel. If now rotative power be applied to hub portion, it is plain, that the conjunctional and constrictive grip of pivotal members will be intensified in the forward quarter of the wheel, that this grip will be maintained in the lower quarter of the wheel during rotation of wheel and will assist the peripheral engagement of buffer shoulders with buffer seats "g" and "gg" in lower quarter of wheel in rotating ground wheel with the hub portion. It will also be plain that in the rearward quarter of such driving wheel the rotative power will oppose effect of gravitational load and release the grip of rearward pivotal members on buffer shoulders, "w," causing the hub portion to tend to ascend inclining ground wheel forwardly and cause part of gravitational and rotative load of vehicle to be transferred ahead of center of wheel, and its center of stable equilibrium. It will be plain, also, that during the successive gripping and releasing of the resilient-body-buffer shoulders and ribs by the pivotal members "d," in action, the hub portion of wheel will slightly rotate within the ground wheel and cause the members "d" to successively engage all quarters or sections of the resilient body and its buffer shoulders and ribs and equally distribute contact of members "d" with said buffer shoulders and ribs.

It will be observed that reversing the rotative power applied to hub, for purposes of retarding or reversing progress of vehicle would transfer the before described application of power from the forward to the rearward quarter of wheel with corresponding results. Since buffer shoulders "w" on each side of wheel alternately engage the buffer seats "gg," and keepers "t" on the non-swinging ends of pivotal members "d" in lower quarter of wheel during depression of hub relative to ground wheel; since buffer ribs "y" engage extensions "h" during excessive constrictive grip of pivotal members on the resilient body; since buffer shoulders and buffer seats restrain contact of resilient body with ground wheel or its parts forward and rearward of wheel center in vertical swing of resilient body relative to ground wheel; and since lateral thrusts of hub portion and of ground wheel are controlled by progressive, multiple contact of extensions "*h*" with buffer shoulders, ribs and bases of resilient body it is plain that the resilient body may perform its functions free from abrasive contact with other members of the wheel. It is plain, too, that the lateral swing of hub portion and the ground wheel relative to each other, for shock absorption will be ample and controlled since thrusts of each member will be usually restrained and absorbed in resilient body between buffer shoulders "*w*" and bases "*j*," and, will be positively restrained in engagement of buffer bases "*j*" with extensions "*h*" of pivotal members "*d*."

Having fully described the construction and operation of my invention, what I particularly claim is, 1. In a wheel having a ground wheel portion, with equally distanced, alternately and transversely disposed pivotal members pivotally secured thereto on each side thereof, by means of bearings secured to the ground wheel, and engaging an end of each pivotal member, a hub portion supported on the ground wheel, capable of movement relative thereto and, having an annular resilient body with annular buffer shoulders on each side thereof, rigidly secured thereon.

2. In a wheel having a hub portion and an annular resilient body with annular buffer shoulders on each side thereof, rigidly secured to the hub portion, a ground wheel supporting the hub portion and capable of movement relative thereto, having pivotal, transversely disposed members secured thereto, by means of bearings secured to ground wheel by bolts, and engaging an end of each pivotal member engaging said annular buffer shoulders on each side of the resilient body.

3. In a wheel having a hub portion and an annular resilient body rigidly secured to the hub portion, a ground wheel supporting said resilient body and said hub portion, and capable of movement relative thereto, having extensions from its body, supporting the radial ends of transverse pivotal members secured to said ground wheel.

4. In a wheel having a hub portion and an annular resilient body with annular buffer shoulders on each side thereof, rigidly secured to the hub portion, a ground wheel supporting the resilient body and the hub portion, and movable relative thereto, having equally spaced extensions from its body carrying transverse pivotal members secured thereto by axles on one end of said pivotal members, embraced by bearings bolted on said extensions.

5. In a wheel having a hub portion and ground wheel capable of movement relative thereto, an annular resilient body interposed between the hub portion and the ground wheel, rigidly secured to one of the said members, loosely engaging transverse pivotal members secured to the other said member, and, having annular buffer shoulders, annular buffer ribs, and annular buffer bases, disposed on each side thereof, between said resilient body and other wheel members.

6. In a wheel of the character described, having a hub portion and a ground wheel, capable of movement relative thereto, an annular resilient body interposed between the hub portion and the ground wheel, rigidly and removably secured to the hub portion, and laterally and radially engaging a plurality of pivotal members secured to the ground wheel, and transversely disposed between the said resilient body and the said ground wheel.

7. In a wheel of the character described, having a hub portion and a ground wheel capable of movement relative thereto, an annular resilient body interposed between the hub portion and the ground wheel, rigidly secured to the hub portion, having annular buffer shoulders disposed on each side thereof in engagement with transversely disposed pivotal members of the ground wheel and adapted to maintaining the hub portion and the ground wheel in the same relative plane.

8. In a wheel of the character described, having a hub portion and a ground wheel capable of movement relative thereto, an annular resilient body interposed between the hub portion and the ground wheel and rigidly secured to the hub portion, having annular buffer ribs and shoulders disposed on each side thereof in engagement with transversely disposed pivotal members of the ground wheel and adapted to receiving resisting and absorbing both hub and ground wheel thrusts.

9. In a wheel of character described, having a hub portion and a ground wheel capable of movement relative thereto, an annular resilient body interposed between the hub portion and the ground wheel, and rigidly secured to the hub portion, having annular resilient buffer bodies disposed on each side thereof, in normal and operative engagement with transverse pivotal members of the ground wheel.

10. In a wheel of the character described, having a hub portion and a ground wheel, capable of movement relative to each other, a plurality of annular resilient bodies interposed between the hub portion and the ground wheel and rigidly secured to the hub portion, having annular buffer shoulders and ribs disposed on each of the sides of said resilient bodies, in single, multiple, lateral, and radial engagement with transverse pivotal members of the ground wheel.

11. In a wheel of character described, having a hub member, a ground wheel capable of movement relative thereto, and an annular resilient body interposed between the hub member and the ground wheel, a plurality of annular buffer shoulders and ribs, laterally and radially disposed about the resilient body, engaging transverse pivotal members of the ground wheel.

12. In a wheel having a hub portion, a ground wheel capable of movement relative thereto, and an annular resilient body secured to the hub portion, annular buffer shoulders, annular buffer ribs, and annular buffer bases, disposed laterally on each side of resilient body at normally progressively greater distances from transversely disposed pivotal members secured, at one end, by axles and bearings, to the ground wheel, and engaging said pivotal members.

13. In a wheel having a hub portion, a ground wheel capable of movement relative thereto, and an annular resilient body secured to the hub portion, annular resilient buffer bodies, disposed on each side of resilient body, and a plurality of transversely disposed pivotal members secured, by bearings bolted on said ground wheel embracing axles on one end of said pivotal members; a plurality of bearing supports rigidly secured to the ground wheel, alternately on each side of the ground wheel, embracing and supporting axles on the secured ends of said pivotal members; and, keepers secured to the ground wheel, retaining axles of pivotal members in recesses of said ground wheel bearings.

14. In a wheel having a hub portion, a ground wheel capable of movement relative thereto, an annular resilient body secured to the hub portion, and annular buffer bodies disposed on each side of the resilient body, non-corrosive pivotal means secured transversely on the ground wheel by axles on one end of said pivotal means embraced by bearings secured to one side of said ground wheel, and by roller bearings on other side of ground wheel supporting the free ends of said pivotal members, and engaging said buffer bodies and said resilient body.

15. In a wheel having a hub portion, a ground wheel capable of movement relative thereto, an annular resilient body secured to the hub portion, and annular buffer bodies disposed on each side of the resilient body, and pivotal means secured transversely on the ground wheel, between said resilient body and said ground wheel, by means of axles on one end of said pivotal means, and bearings secured to the ground wheel, alternately on each side, thereof, bearings secured alternately, to each side of the ground wheel, under and supporting the free ends of the transverse pivotal means.

16. In a wheel having a hub portion, a ground wheel capable of movement relative thereto, an annular resilient body removably secured to the hub portion, and flexible annular buffer bodies disposed on each side of the annular resilient body, pivotal means secured to the ground wheel at equal distances from each other alternately on each side of the ground wheel, by an axle on one end of each of said pivotal means embraced by a bearing removably secured to the ground wheel.

17. In a wheel the combination a hub portion, a ground wheel capable of movement relative thereto, an annular resilient body, a plurality of pivotal members interposed between hub portion and ground wheel, and an annular mud and sand guard, or apron, removably and rigidly secured to each side of the ground wheel and adapted to protect said resilient body and said pivotal members.

In testimony whereof, I affix my signature in presence of two witnesses.

MARION MILTON BAILEY.

Witnesses:
ALBERT E. FLINDT,
J. W. HUNTOON.

Copies of this patent may be obtained for five cents each, by addressing the "Commissioner of Patents, Washington, D. C."